United States Patent [19]

Ecktman et al.

[11] Patent Number: 5,326,082

[45] Date of Patent: Jul. 5, 1994

[54] SELF LOCKING, SNAP MOUNTED ATTACHMENT DEVICE

[75] Inventors: Jack D. Ecktman, Indianapolis; Matthew A. Robbins, Elkhart, both of Ind.

[73] Assignee: Bridgestone/Firestone, Inc., Akron, Ohio

[21] Appl. No.: 896,706

[22] Filed: Jun. 10, 1992

[51] Int. Cl.$^5$ .............................................. B60G 11/26
[52] U.S. Cl. .............................. 267/64.27; 267/64.24; 403/254
[58] Field of Search .............................. 411/508–510, 411/913; 403/41, 70, 71, 254, 381; 267/64.27, 64.24, 64.19, 64.21, 35

[56] References Cited

U.S. PATENT DOCUMENTS

| | | | |
|---|---|---|---|
| 3,169,292 | 2/1965 | Fenton | 24/213 |
| 3,415,155 | 12/1968 | Riddell et al. | 85/80 |
| 3,449,799 | 6/1969 | Bien | 411/510 |
| 3,476,008 | 11/1969 | Pearson et al. | 85/5 |
| 3,818,729 | 6/1974 | Kenreich et al. | 68/23.7 |
| 4,012,155 | 3/1977 | Morris | 403/290 |
| 4,506,910 | 3/1985 | Bierens | 267/64.27 |
| 4,564,177 | 1/1986 | Leonard | 267/64.24 |
| 4,657,229 | 4/1987 | Thurow | 267/64.27 |
| 4,739,543 | 4/1988 | Harris, Jr. | 24/297 |
| 4,787,606 | 11/1988 | Geno et al. | 267/64.27 |
| 4,804,303 | 2/1989 | Statkus | 411/41 |
| 4,852,861 | 8/1989 | Harris | 267/64.27 |
| 5,005,265 | 4/1991 | Muller | 24/453 |
| 5,143,500 | 9/1992 | Schuring et al. | 411/508 |

FOREIGN PATENT DOCUMENTS 3741921 6/1989 Fed. Rep. of Germany ...... 411/508

Primary Examiner—Robert J. Oberleitner
Assistant Examiner—Chris Schwartz
Attorney, Agent, or Firm—David A. Thomas

[57] ABSTRACT

A self locking, snap mounted attachment device formed integrally with a plastic member, such as the end plate or piston of an air spring, for mounting the member on a separate support member. The device has a rigid member terminating in arcuate outer surfaces. Preferably two pairs of flexible fingers are mounted between the arcuate end surfaces on opposite sides of the rigid member. The fingers have stems with curved outer surfaces, which in combination with the curved surfaces of the rigid member define an imaginary circle complemental to a circular hole in the support member into which the attachment device is to be inserted. A shoulder is formed on each of the finger stems and snaps into engagement with the support member after passing through the attachment hole. The rigid member resists shear forces exerted on the device and the fingers automatically snap into position to secure the end plate or piston on the support member when the device is inserted into the attachment hole.

20 Claims, 3 Drawing Sheets

SELF LOCKING, SNAP MOUNTED ATTACHMENT DEVICE

BACKGROUND OF THE INVENTION

1. Technical Field

The invention relates to attachment devices and in particular to a self locking, snap mounted attachment device intended primarily for use for mounting the end members of an air spring between two spaced support members without additional attachment fasteners.

2. Background Information

Air springs consisting of a pair of spaced end members and an intervening flexible sleeve or bellows which forms an internal pressurized fluid chamber, have been used for many applications, such as mounting between spaced components of a vehicle for absorbing road shock, supporting parts of machines and equipment such as presses on which shock forces are continually imparted, and for regulating and maintaining the spacing between two spaced components of various pieces of equipment. These air springs assume various configurations depending upon their particular application. Such air springs usually consist of one end member which is an end cap with the other end member being a piston. The piston usually has a conical outer surface over which a rolling lobe of the flexible bellows moves for affecting the damper of the vehicle or equipment on which the air spring is mounted. Some examples of such prior art air springs are shown in U.S. Pat. Nos. 4,564,177, 4,787,606 and 4,852,861.

Heretofore, these air springs were attached to the spaced supporting members, and in particular to the spaced components of a vehicle, by various attachment bolts or fasteners which extend into the piston and end cap such as shown in certain of the above referenced patents.

However, for certain applications, due to the limited space available for mounting the air springs within a vehicle and the inaccessibility of the air spring mounting supports or brackets, difficulties are encountered in reaching both ends of the air spring for securing the same to the supporting structures by usual attachment bolts. Also, the use of separate attachment bolts, even if access is possible, requires additional equipment and manpower for securing the bolts to the air springs.

Therefore, the need exists for an improved attachment device for mounting a first member such as an end cap of an air spring onto a supporting structure, and in particular for mounting the end cap and piston of an air spring onto spaced supports within a vehicle without separate attachment bolts or fasteners.

Various types of self locking or snap mounted attachment devices have been developed in the past for various applications, examples of which are shown in the following patents.

U.S. Pat. No. 3,169,292 discloses a snap fastener which includes a stud element having beveled surfaces which joins a neck and a large diameter surface. The beveled surface will facilitate removal of the stud from the socket opening. A bulbous head has a curved cam surface which facilitates attachment of the fastener to the socket.

U.S. Pat. No. 3,415,155 discloses a bushing formed of plastic having resilient ears which project radially outwardly from a main body of the bushing adjacent one end, and has a radial annular shoulder on the bushing adjacent the other end which is snap fitted through a hole in a plate when inserted through the hole with the ears remaining on the exterior of the plate, afterwhich a pin is snap fitted into the bushing.

U.S. Pat. No. 3,476,008 discloses a fastener having a shoulder portion that facilitates secure attachment of the fastener. The stud fastener has a disc shaped head and legs which have shoulders which extend through a support aperture to engage edges of the aperture and attach the fastener to the support.

U.S. Pat. No. 3,818,729 discloses a brake yoke rod retainer for an automatic washer which has a plurality of segments which have frustoconical surfaces which are formed as angled cam surfaces to facilitate installation and removal of the retainer on the washer.

U.S. Pat. No. 4,012,155 discloses a snap lock connector in which a male member of the connector has leading and camming surfaces which correspond to leading and camming surfaces of a female member. These camming surfaces facilitate the insertion and withdrawal of the male member within the female member. The connector is used principally for assembling furniture to facilitate storage and shipping.

U.S. Pat. No. 4,804,303 discloses an attachment block assembly that is connected to a support structure by use of resilient leg elements. A base component is forcibly removed from the frame plate by flexing the resilient legs inwardly so that a latch member will be allowed to glide over the edge of an opening. The snap fastener legs each have a cam surface to facilitate removal and insertion of the fastener from a plate.

U.S. Pat. No. 4,739,543 discloses a push pin fastener for securing automotive trim to an automobile body. The fastener includes two cantilevered arms or legs having locking surfaces which facilitate insertion of the pin and prevent removal once inserted.

U.S. Pat. No. 5,005,265 discloses a two piece stud assembly in which the stud has a plurality of angled flexible camming members engaged within a counterboard receiving aperture of a second member for securing the stud within the bushing for attaching two members together.

Although many of the prior art self locking, snap mounted attachment devices perform satisfactory for their intended purpose, they would not be suitable for applications in which the attached device would experience shear forces, which forces are exerted in a generally radial direction on the attachment device, in addition to resisting longitudinal or axial pull out of the device from the attachment members. Most of the known prior art fasteners and attachment devices provide an easy means of attaching a member to a supporting structure by the use of flexible, cam actuated members. However these flexible members are not able to resist shear loading due to the flexible fingers or tabs being unable to resist such forces without becoming loose or breaking in the supporting structure.

Therefore, the need exists for an improved attachment device which permits the ease of assembly of a member onto an attachment member, and in particular for securing an air spring between two spaced supports, in which the attachment device is able to withstand radial shear forces without loosening of the mounted member or lessening of the retention of the securement fingers with respect to the mounting structures.

SUMMARY OF THE INVENTION

Objectives of the invention include providing an improved self locking, snap mounted attachment device which is molded of a high strength plastic material integrally with a base plate or member, and is adapted to be inserted through a circular hole formed in an adjacent support plate or structure for mounting the member onto the structure without additional fasteners.

A still further objective of the invention is to provide such an attachment device which includes a rigid member, which terminates in a pair of outer curved arcuate surfaces which engage the cylindrical sidewall of the attachment hole for absorbing shear forces exerted on the attachment device preventing damage to the device and loosening of its mounting on a support plate.

Another objective of the invention is to provide such an attachment device having a plurality of flexible fingers formed with camming surfaces and shoulders, which fingers are snap fitted into an attachment plate hole for retaining the attachment device within the hole, which fingers are unaffected by shear forces acting on the device due to the use of the intervening rigid member.

Another objective is to provide such an attachment device in which the flexible fingers are molded integrally with a base of the device and are connected thereto by fillets which provide stress relief areas to prevent cracking as the fingers are flexed inwardly upon insertion through a mounting hole.

A still further objective is to provide such an attachment device, and in particular in combination with an air spring having a pair of the attachment devices on the opposed end members, to enable the air spring to be mounted easily between a pair of spaced support plates or members of a vehicle in a simple manual operation without requiring additional tools or fasteners; and in which the air spring will be firmly mounted between the spaced members relatively unaffected by shear forces exerted thereon while retaining a tight mounting connection with the vehicle eliminating rattle or movement of the air spring once installed in position.

These objectives and advantages are obtained by the improved attachment device of the present invention, the general nature of which may be stated as including a rigid post having a pair of diametrically opposed arcuate end surfaces and at least one arcuate flexible finger mounted on opposite sides of said post between said arcuate end surfaces, each of said fingers having a stem, an outwardly extending shoulder and an outer angled camming surface; said stems and arcuate end surfaces defining an imaginary circle generally complementary to a circular opening in a support member into which said attachment device is to be inserted for securing another member thereto on which said attachment device is formed.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
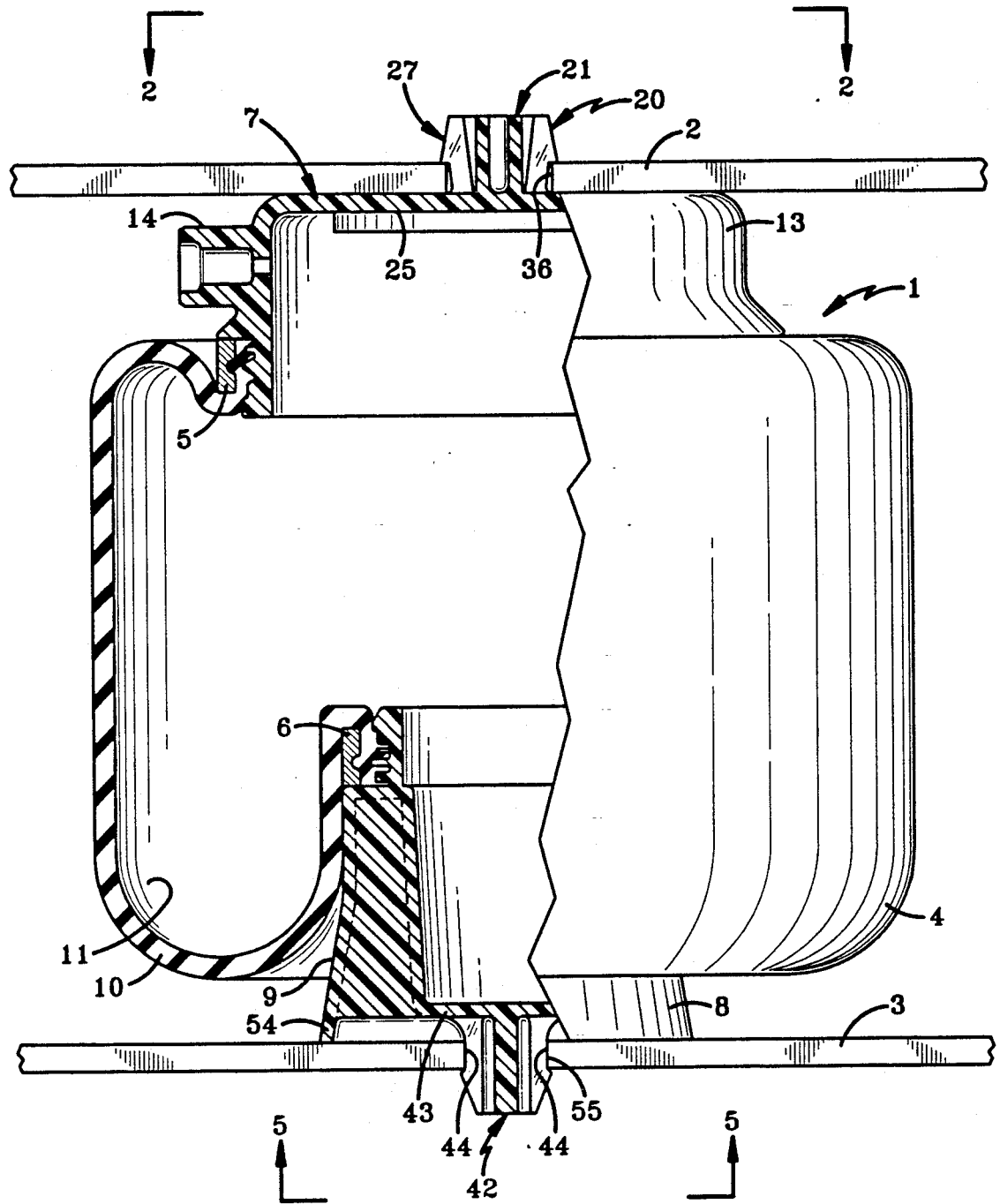
FIG. 1 is a side elevational view with portions broken away and in section, showing the improved attachment device of the invention mounting an air spring between two spaced support plates.

An air spring indicated generally at 1, is shown in FIG. 1 having the attachment device of the present invention formed on both ends thereof, mounted between a pair of spaced end plates or supporting structures 2 and 3. Air spring 1 is of a usual construction consisting of an open ended flexible sleeve or bellows 4, which is sealingly secured by clamp rings 5 and 6 to an end cap 7 and to a piston 8, respectively. Such a construction is shown generally in U.S. Pat. No. 4,852,861. Piston 8 has a conical outer wall 9 along which a rolling lobe 10 of bellows 4 will move when the air spring moves between an expanded and a compressed position, to achieve a desired damping by a compressed fluid, such as air, contained within a fluid chamber 11 of bellows 4.

Figure 2:
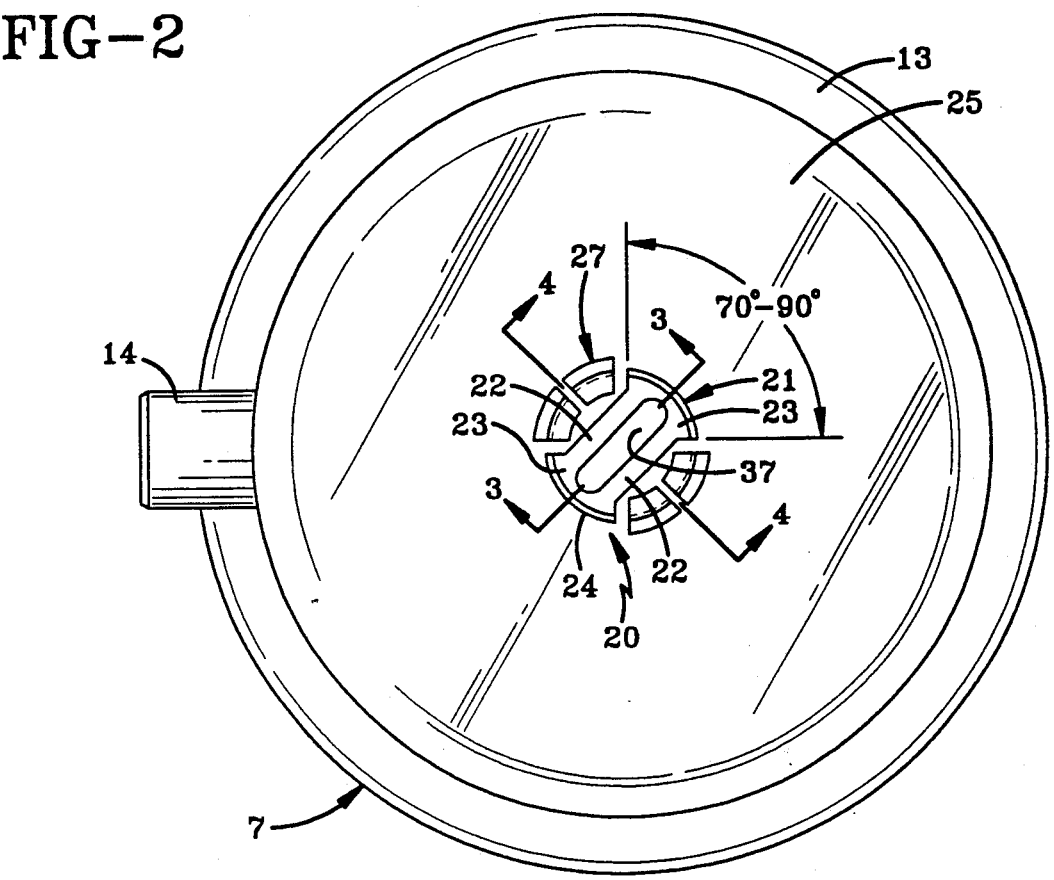
FIG. 2 is a top plan view of the attachment device looking in the direction of arrows 2—2, FIG. 1, with the support plate being removed.
Figure 3:
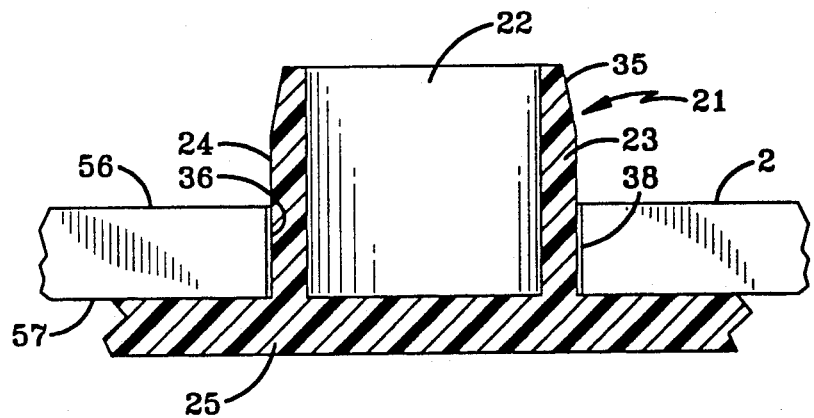
FIG. 3 is an enlarged fragmentary sectional view taken on line 3—3, FIG. 2, with the support plate being shown.
Figure 4:
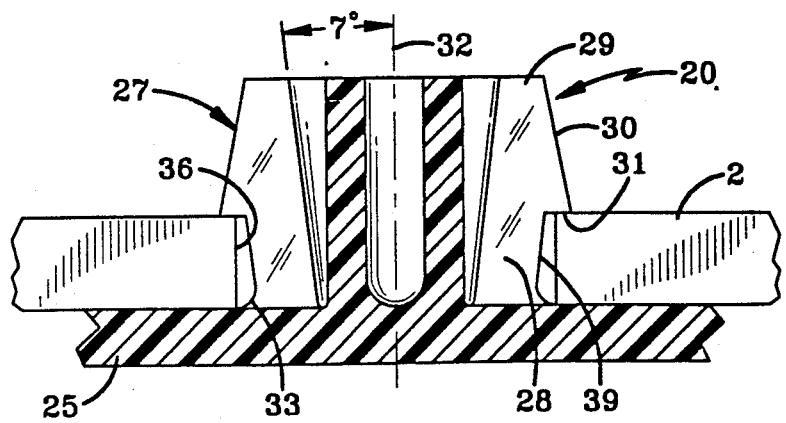
FIG. 4 is an enlarged fragmentary sectional view taken along ling 4—4, FIG. 2, with the support plate being shown.
Figure 5:
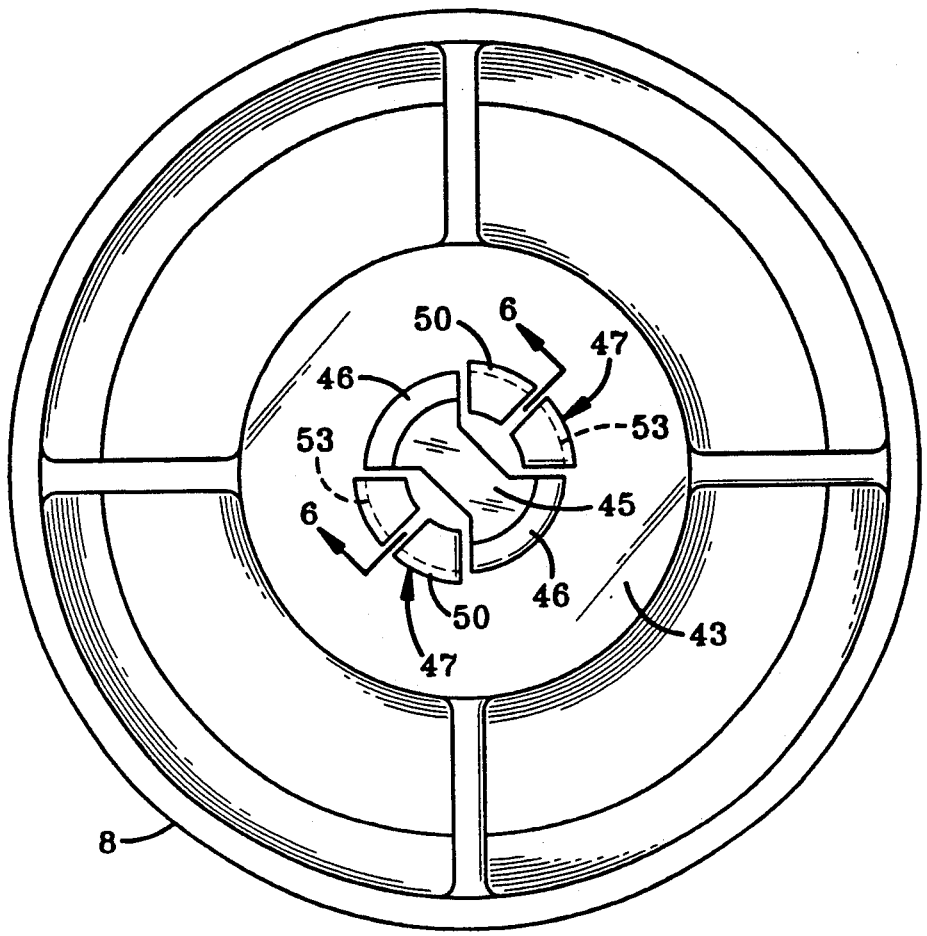
FIG. 5 is an enlarged plan view looking in the direction of arrows 5—5, FIG. 1, with the support plate being removed.

End cap 7 includes a generally cylindrical outer wall 13 and may be provided with a fluid inlet coupling 14 for supplying pressurized fluid into chamber 11. One form of the improved attachment device is indicated generally at 20, and is shown in FIG. 1 mounting end cap 7 onto support plate 2. Referring to FIGS. 2-4, attachment device 20 includes a rigid post like member indicated generally at 21, which includes a pair of spaced walls 22 terminating in a pair of connecting curved end members 23 having outer curved end surfaces 24. Member 21 is a one piece member, molded of plastic integrally with disc shaped top wall or base 25 of end cap 7, and extends perpendicularly upwardly from the flat top planar surface of end wall 25.

The outer free ends of curved end members 23 preferably have a tapered portion 35 to facilitate the insertion of attachment device 20 through a circular hole 36 which is formed in plate 2, as shown in FIGS. 3 and 4. Bone-shaped rigid member 21 preferably is U-shaped in cross section as shown in FIG. 4, and has a generally oval shaped central opening 37 formed between the spaced walls and curved end members to facilitate the molding of attachment device 20. Opening 37 enables uniform wall thicknesses to be achieved and maintained during molding due to the reduction in shrinkage of the plastic components upon cooling.

Attachment device 20 further includes two pairs of flexible fingers, each finger being indicated generally at 27, which are molded integrally with end wall 25 of end cap 7, as shown in FIG. 4, and extend upwardly therefrom at an outwardly inclined direction. Each finger 27 includes a stem 28 which terminates in a tip 29. Tip 29 has a downwardly outwardly extending camming surface 30 which joins with stem 28 by a radially extending shoulder 31. Fingers 27 extend outwardly at an angle of approximately 7° with respect to a longitudinal axis 32 of attachment device 20. The connected ends of stems 28 connect with end wall 25 by curved fillets 33 which provide stress relief areas to prevent breakage of the fingers when they are flexed in an inwardly direction toward rigid member 21 when installed on plate 2.

In accordance with one of the features of the invention, outer curved end surfaces 24 lie in an imaginary circle which is generally complementary to and slightly less than the diameter of plate hole 36 so as to permit the insertion of attachment device therethrough as shown in FIG. 3, while providing a very slight amount of clearance between cylindrical wall 38 which defines hole 36, and end surfaces 24. This clearance permits the insertion of the attachment device through the circular hole without undue sliding pressure between end surfaces 24 and cylindrical wall 38, while preventing excessive movement between attachment device 20 and plate 2 while providing a secure fit therebetween. Furthermore, outer surfaces 39 of finger stems 28, as well as portions of camming surfaces 30, lie on the imaginary circle defined by curved end surfaces 24 of rigid member 21.

Referring to FIG. 4, as attachment device 20 is inserted through plate hole 36, camming surfaces 30 will contact cylindrical wall 38 of hole 36 and flex inwardly until shoulders 31 pass beyond a top edge of hole 36 whereupon the stressed fingers will snap outwardly to assume the position as shown in FIG. 4, wherein radial shoulders 31 will engage plate 2 surrounding hole 36. The vertical spacing between shoulder 31 and the top surface of end cap or base 25 is preferably equal to or slightly greater than the thickness of support plate 2, so that the attachment device mounts end cap 7 onto plate 2.

In accordance with one of the main features of the invention, rigid member 21 provides a rigid structure which will resist shear forces exerted in a general radial direction against the attachment device, preventing such shear forces from being exerted onto the flexible fingers which are unable to sufficiently resist any such large radial forces. Furthermore, the flexible fingers provide for the securement of end cap 7 to plate 2 and prevent movement in the axial or longitudinal direction between these two members.

It has been found that providing outer curved end surfaces 24 with an arcuate length of between 70° and 90° and camming surfaces 30 with a taper of approximately 45°, will achieve satisfactory results. Also the use of two pairs of flexible fingers 27 located on opposite sides of rigid member 21 as shown in FIG. 2, provides better results than that achieved if only a single flexible finger was used on each side of member 21. This construction provides sufficient flexibility for the fingers when attachment device 20 is inserted through plate hole 36. Although for certain installations, a single flexible finger on each side of the rigid member 21 may be satisfactory, the use of a pair of flexible fingers on each side has been found to provide the desired flexibility and holding force for securing end cap 7 to plate 2.

Another form of the improved attachment device is indicated generally at 42, and is shown on the bottom surface or base 43 of piston 8 and extends perpendicularly downwardly therefrom as shown in FIG. 1, for insertion through a circular attachment hole 44 formed in support plate 3. Attachment device 42 is similar in many respects to attachment device 20 described above, in that it includes a rigid member 45 which terminates in a pair of curved end surfaces 46, which surfaces lie on an imaginary circle generally complementary to the diameter of plate hole 44. Rigid member 45 is a solid member as opposed to being formed by two spaced walls as is rigid member 21.

Figure 6:
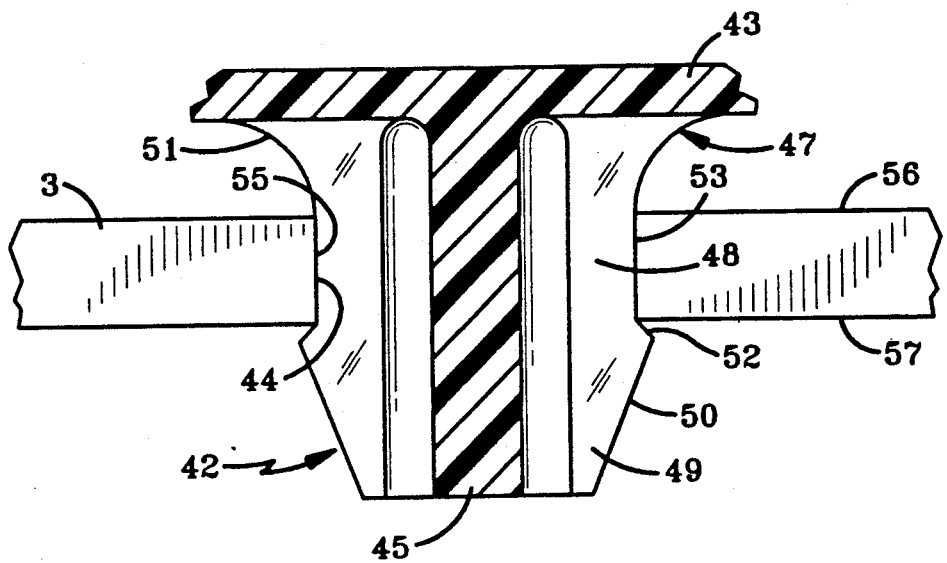
FIG. 6 is an enlarged fragmentary sectional view taken along line 6—6, FIG. 5, with the support plate being shown.

Furthermore, a pair of flexible fingers 47 (FIG. 6) is formed on each side of rigid member 45 between the curved end surfaces, and are molded integrally with piston base 43 and extend generally perpendicularly therefrom as is member 45. Fingers 47 are similar to each other, each including a stem 48 which terminates in a tip 49 having a camming surface 50, a connecting stress relief fillet 51 and an outwardly extending shoulder 52. Each stem 48 includes an intermediate curved portion 53 which lies on the same imaginary circle as does curved outer end surfaces 46 of rigid member 45.

In the particular air spring embodiment shown in FIG. 1, piston base 43 is recessed by an annular outer flange 54 which enables large stress relief fillets 51 to be utilized and enables curved intermediate stem portions 53 to match the inside diameter of cylindrical wall 55 which forms circular hole 44, providing for a relatively snug fit therebetween. Again, fillets 51 provide the required stress relief areas to prevent cracking upon the inward flexing of the fingers as attachment device 42 is inserted into hole 44 and the edges of the hole engage and move along finger cam surfaces 50.

After passage of shoulders 52 through hole 44, the fingers will snap outwardly and be retained in position by shoulders 52. The angle of cam surfaces 50 is smaller than the angle of shoulders 52 to facilitate the insertion of device 42 through hole 44. In accordance with another feature of the invention, angled shoulders 52 enable device 42 to be removed outwardly through hole 44 for repair or replacement of air spring 1 in contrast to generally right angled shoulders 31, and to prevent damage to bellows 4 should the separation between structures 2 and 3 become excessive during work on a vehicle or equipment on which air spring 1 is mounted.

Again, curved surfaces 46 and rigid member 45 absorb any shear loading exerted on attachment device 42, with the flexible fingers providing the mounting and retaining feature of attachment device 42. Again, the use of a pair of flexible fingers 47 on each side of rigid member 45 is preferred, as opposed to a single flexible finger in order to provide increased flexibility to the fingers while providing sufficient arcuate lengths of curved portions 53 for abutting engagement with cylindrical wall 55 of plate hole 44.

Thus, in addition to each of the attachment devices 20 and 42 providing a self locking, snap mounted device for securing one object to another, the combination of the two attachment devices on an air spring provides an extremely satisfactory means for mounting air spring 1 between spaced plates 2 and 3. Piston attachment device 42 (FIG. 1) can be inserted easily into hole 44 and snugly secured therein with top attachment device 20 being inserted through top hole 36 to rigidly mount the air spring between the spaced support plates without requiring any additional attachment fasteners, as well as not requiring any access to the inserted ends of the attachment device or to the outer surfaces of plates 2 and 3, which in certain applications may not be possible. It is easily seen that the air spring can be collapsed and placed between spaced plates 2 and 3 and then the two attachment devices moved outwardly through their respective holes, afterwhich the air spring is inflated securely mounting it in position between the end plates. All of these steps can be done in a simple manual procedure without the use of any equipment or additional fasteners.

After installation the air spring, the end attachment devices are able to withstand shear and bending loading thereon without breaking and without the flexible fingers loosening their grip on the attachment plates, due to rigid members 21 and 45 absorbing any shear forces exerted thereon, with the flexible fingers retaining the attachment devices in firm engagement with those portions of the end plates surrounding the mounting holes. Furthermore, as shown in FIGS. 1, 3, 4 and 6, circular holes 36 and 44, and in particular cylindrical walls 38 and 55 thereof, form right angles with the adjacent spaced surfaces 56 and 57 of the plates, and do not require any specially configured hole for receiving the attachment devices as in prior self locking, snap mounted members. This again reduces cost by enabling plates 2 and 3 to be punched or drilled in a simple operation for receiving the attachment devices therein.

Accordingly, the self locking, snap mounted attachment device of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved self locking, snap mounted attachment device is constructed and used, the characteristics of the device, and the advantageous, new and useful results obtained; the new and useful structures, devices, elements, arrangements, parts and combinations, are set forth in the appended claims.

We claim:

1. In combination, a support member, an attachment device and a first member, the attachment device attaching the first member onto said support member wherein said support member is formed with a generally circular attachment hole, said device including:

a rigid member formed integrally with and extending outwardly from the first member and having a pair of diametrically opposed arcuate end surfaces having a radius of curvature generally complementary to the curvature of the attachment hole of the support member, with the distance between said two end surfaces being generally equal to the diameter of said attachment hole; and at least two pairs of flexible fingers formed integrally with and extending outwardly from the first member, said pairs being located between the arcuate end surfaces of the rigid member and diametrically opposite of each other, each of said fingers having a stem terminating in a tip provided with an outwardly extending shoulder and a tapered camming surface, said fingers being moved inwardly by engagement of the camming surfaces with the support member as the fingers and rigid member pass through said hole thereafter returning toward their original position, with the finger shoulders being engageable with the support member to attach the first member on said support member, and with said rigid member resisting shear forces exerted generally radially on said attachment device.

2. The combination defined in claim 1 in which the rigid member includes a body formed by a pair of spaced walls having outer ends connected by the arcuate end surfaces.

3. The combination defined in claim 2 in which the spaced walls extend perpendicularly outwardly from the first member.

4. The combination defined in claim 1 in which the flexible finger stems extend outwardly at an inclined angle to the longitudinal axis of the attachment device.

5. The combination defined in claim 4 in which the inclined angle of the stems is approximately 7° from the longitudinal axis of the attachment device.

6. The combination defined in claim 1 in which the first member includes a generally flat base extending in a plane generally at a right angle to a longitudinal axis of the attachment device.

7. The combination defined in claim 6 in which the stems of the flexible fingers merge with the flat base by fillets to provide a stress relief area.

8. The combination defined in claim 6 in which the flexible finger shoulders extend generally parallel to the plane of the first member base and are spaced from said base a distance generally equal to the thickness of the portion of the support member which surrounds the attachment hole.

9. The combination defined in claim 1 in which the first member includes a generally flat base; and in which the stems of certain of the flexible fingers extend outwardly from said base generally parallel with a longitudinal axis of the attachment device and have generally straight outer surface portions which engage those portions of the support member which define the circular attachment hole.

10. The combination defined in claim 9 in which the base of the first member is spaced from the support member when the first member is attached to said support member by the attachment device.

11. The combination defined in claim 9 in which the shoulders of said certain flexible fingers are inclined outwardly and away from the base of the first member.

12. The combination defined in claim 1 in which each of the arcuate end surfaces of the rigid member has an arcuate length of between 70° and 90°.

13. The combination defined in claim 1 in which the arcuate end surfaces of said rigid member have inwardly extending beveled outer end portions.

14. The combination defined in claim 1 in which the rigid member is general U-shaped in transverse cross section.

15. The combination defined in claim 1 in which the hole of the support member is defined by a cylindrical wall which joins with a pair of spaced surfaces of the support member at generally right angles.

16. The combination defined in claim 1 in which the first member is an end member of an air spring.

17. A self locking, snap mounted attachment device including a member having a generally flat base portion; a rigid post having a pair of diametrically opposed arcuate end surfaces and at least one arcuate flexible finger mounted on opposite sides of said post between said arcuate end surfaces and formed integrally with said flat base portion and projecting outwardly therefrom, each of said fingers having a stem, an outwardly extending shoulder and an outer angled camming surface; said stems and arcuate end surfaces defining an imaginary circle generally complementary to a circular opening in a support member into which said attachment device is to be inserted for securing said member thereto.

18. The attachment device defined in claim 17 in which a pair of flexible fingers is mounted on opposite sides of said post between the arcuate end surfaces.

19. The attachment device defined in claim 17 in which said member is an end member of an air spring; and in which said rigid post and flexible fingers and end member are integrally molded of plastic.

20. In an improved air spring having a pair of spaced end members and a flexible sleeve having a pair of open ends sealingly connected to the end members and extending therebetween to form a fluid pressure chamber, said improvement including first and second attachment members formed integrally with the end members, each of said attachment members having a rigid member formed integrally with each of the end members and terminating in a pair of opposed curved end surfaces lying on an imaginary circle substantially equal to a circular mounting hole formed in a supporting structure in which said air spring is intended to be mounted; and at least a pair of flexible fingers formed integrally with each of the end members, between and on opposite sides of the rigid member, and having camming surfaces and retaining shoulders for gripping the supporting structure around the mounting holes when said fingers are inserted through said holed to mount the end members on the supporting structure.

* * * * *